(12) United States Patent
Remez

(10) Patent No.: US 10,014,088 B2
(45) Date of Patent: Jul. 3, 2018

(54) METHOD FOR PROCESSING LIQUID RADIOACTIVE WASTE AND FOR THE RECOVERY THEREOF

(71) Applicant: EKSORB LTD, Ekaterinburg (RU)

(72) Inventor: Victor Pavlovich Remez, Ekaterinburg (RU)

(73) Assignee: EKSORB LTD, Ekaterinburg (RU)

( * ) Notice: Subject to any disclaimer, the term of this patent is extended or adjusted under 35 U.S.C. 154(b) by 0 days.

(21) Appl. No.: 15/540,393

(22) PCT Filed: Nov. 12, 2015

(86) PCT No.: PCT/RU2015/000768
§ 371 (c)(1),
(2) Date: Jun. 28, 2017

(87) PCT Pub. No.: WO2016/108727
PCT Pub. Date: Jul. 7, 2016

(65) Prior Publication Data
US 2017/0365369 A1   Dec. 21, 2017

(30) Foreign Application Priority Data

Dec. 29, 2014 (RU) ................ 2014153336

(51) Int. Cl.
*G21F 9/20* (2006.01)
*G21F 9/06* (2006.01)
*B01D 39/14* (2006.01)
*B01D 46/00* (2006.01)
*B01D 15/00* (2006.01)

(52) U.S. Cl.
CPC ............... *G21F 9/06* (2013.01); *B01D 39/14* (2013.01); *B01D 46/00* (2013.01); *G21F 9/20* (2013.01); *B01D 15/00* (2013.01)

(58) Field of Classification Search
CPC ............... G21F 9/06; G21F 9/20; B01D 39/14
USPC .......................................... 588/20
See application file for complete search history.

(56) References Cited

U.S. PATENT DOCUMENTS

2013/0153473 A1   6/2013   Brunsell et al.

FOREIGN PATENT DOCUMENTS

| RU | 2066493 C1 | 9/1996 |
| RU | 2268513 C1 | 1/2006 |

*Primary Examiner* — Edward Johnson
(74) *Attorney, Agent, or Firm* — Nadya Reingand; Yan Hankin

(57) ABSTRACT

The invention relates to a technique for handling liquid radioactive waste from a nuclear fuel-energy cycle, and may be used in a process for processing liquid radioactive waste for maximally reducing the volume thereof and removing radionuclides by concentrating same in a solid phase. The aim is achieved by means of a method for processing liquid radioactive waste and for the recovery thereof, including waste oxidation, separating sludge, colloids and suspended particles from a liquid phase, and removing, from the liquid phase, radionuclides to be subsequently recovered using selective sorbents and filters; the method is characterized in that, prior to the stage for separating sludge, colloids and suspended particles from the liquid phase of the radioactive waste, selective sorbents in the form of powders are added and mixed into the liquid waste.

10 Claims, 1 Drawing Sheet

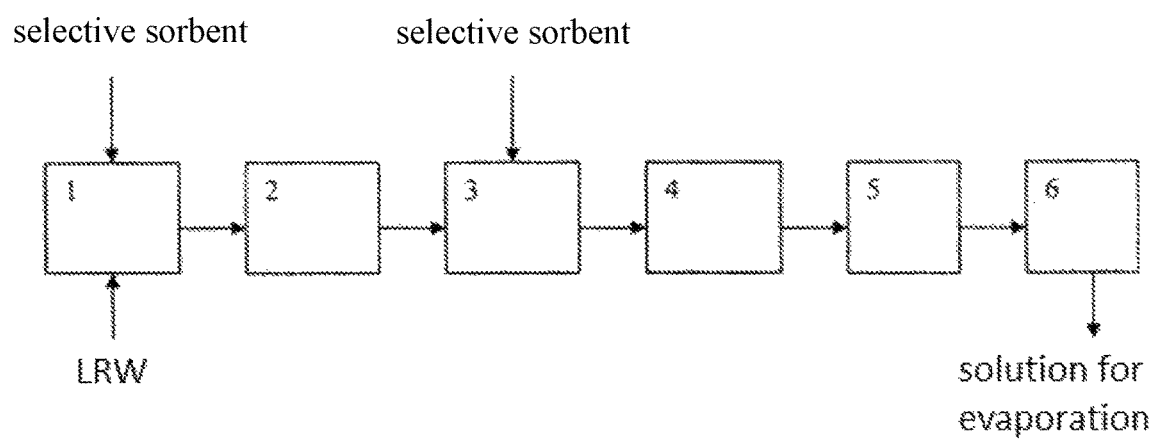

METHOD FOR PROCESSING LIQUID RADIOACTIVE WASTE AND FOR THE RECOVERY THEREOF

CROSS-REFERENCE TO RELATED PATENT APPLICATIONS

The present patent application is a National stage application of PCT application PCT/RU2015/000768 filed Nov. 12, 2015, which claims priority to Russian application RU2014153336 filed Dec. 29, 2014, all of which incorporated herein entirely by reference.

FIELD OF INVENTION

The invention relates generally to the field of treating liquid radioactive waste produced by the nuclear fuel cycle and can be used as part of processing liquid radioactive waste (LRW) to reduce its overall volume and remove radionuclides in a solid phase by concentration method.

BACKGROUND

This method can be used for processing low-level, as well as intermediate-level liquid radioactive waste in the nuclear power industry including: at nuclear power plants; for processing solutions, formed as a result of deactivating buildings, constructions, equipment, transport etc.; for processing natural water polluted by radionuclides.

Processing of liquid radioactive waste has to address two main challenges: cleaning the bulk of waste from radionuclides and reducing the volume of radionuclides concentration to the minimum.

There is a technical solution introduced in the patent RU 2066493, MPK G 21 F 9/08, Nov. 13, 1995, "The METHOD of HANDLING of LIQUID RADIOACTIVE WASTE of the NPP".

the method includes preliminary evaporation of the waste, which produces the condensate and evaporator bottoms; ozone treatment of the bottoms; separation of the radioactive sludge; and deep evaporation that reduces the filtrate. In this case, ozone treatment of evaporator bottoms is performed directly after preliminary evaporation at pH solution level of 12 to 13.5. After separation of radioactive sludge, the filtrate is passed through the filter container with inorganic sorbent selective to caesium. After that, the used-up filter container is sent away for storage or burial.

Another technical solution was suggested in patent RU 2226726, MPK G 21 F 9/08, G 21 F 9/12, Apr. 27, 2002, "The METHOD of CONVERSION of LIQUID RADIOACTIVE WASTE of NUCLEAR POWER PLANT".

the method includes preliminary evaporation of the waste, which produces the condensate and evaporator bottoms; ozone treatment of the bottoms; separation of the radioactive sludge; and deep evaporation that reduces the filtrate. Herein, ozone treatment of evaporator bottoms is performed directly after preliminary evaporation of solution. After separation of radioactive sludge, the filtrate is passed via the filter container with inorganic sorbent selective to caesium. After that, the used-up filter container is sent away for storage or burial.

This well-known method, however, has a few deficiencies, such as: low purification rate of salts emitted at the evaporator bottoms processing stage; a substantial and unsustainable consumption of reagents that interact with initial solution, and also with a permeate and a concentrate, which are derived at later stages.

The closest approach to processing and treatment of liquid radioactive waste is a method described in the U.S. Pat. No. 8,753,518, B01 D 35/00 published in 2014.

A method for processing liquid radioactive waste and its utilization involves waste oxidation; separation of sludge, colloids and suspended particles from the liquid phase; and removal of radionuclides from the liquid phase, for the subsequent recovery using selective sorbents and filters.

Main deficiencies of this method are:

a really complex and costly system of separating liquid components from the solid fractions. The equipment requires accurate adjustment and remote servicing, as it has high radiation exposure for personnel;

the processing results in a high-level waste (sludge from filtering equipment, used-up sorbents or containers with used-up sorbents, filter elements). Managing this waste requires special high-cost radiation safety and protection protocols, so its transportation, disposal and storage (burial) generates significant economic expenses.

SUMMARY

The proposed invention meets the challenge of improving radiation safety of nuclear industry personnel, that is: decreasing the radiation exposure of personnel processing LRW, streamlining the technological process by avoiding the use of expensive and difficult-to-operate radioactive waste cementing unit, reducing the number of other special maintenance equipment, as well as decreasing the amount of secondary waste; and, in the course of LRW processing, delivering a final product—a block that is safe to transport, to use and that doesn't require any radiation safety precautions.

The challenge is tackled by applying a method of processing liquid radioactive waste and its utilization that involves oxidation of waste, separation of sludge, colloids and suspended particles from a liquid phase, and removal of radionuclides from a liquid phase for the purpose of their subsequent recovery using selective sorbents and filters. This method is characterized by the addition of the selective sorbents in a form of powders and mixing them into the liquid waste, prior to a stage of sludge, colloids and suspended particles separation from the liquid phase of the radioactive waste. Then, an obtained suspension is filtered by pumping through at least one waste disposal container and featuring at least one filter element at its exit, which separates insoluble substances from the liquid phase. After that, the filtrate is passed through at least one waste disposal reservoir with granulated selective sorbents; with said container and reservoir placed in concrete blocks. In the course of processing LRW, one or several selective sorbents can be used. Waste disposal container used for the removal of sludge, colloids and suspended particles from the solution, can have two or more filter elements. The obtained suspension can be passed through two or more sequentially connected waste disposal containers with filter elements. The filtrate can be passed through two or more sequentially connected reservoirs containing granulated selective sorbents. In the end of the process, high-penetrating cement mortar is poured into the reservoir containing granulated selective sorbents, as well as into the container with insoluble substances removed from the liquid phase. Prior to pouring the cement mortar, the reservoir is vacuumized and/or heated with hot air or inert gas. The size of granules of the selective sorbents is in a range of 1 to 3 mm. The size of particles of the selective sorbents added in the form of powder is in a range of 0.1 to 0.7 mm.

Concrete blocks containing reservoirs with separated radioactive sludge or used-up sorbents are a final product of LRW processing and its utilization. They do not require further conditioning and can be sent directly for burial or can be used as construction materials for building storage facilities.

BRIEF DESCRIPTION OF DRAWINGS

The principle of the invention is explained in FIG. 1 that presents a scheme of implementing the proposed method.

FIG. 1 shows:
1. Tank for mixing LRW with inorganic selective sorbents in powder form.
2. COREBRICK-F with 2 filter elements (50 microns and 5 microns).
3. Ozone treatment unit.
4. COREBRICK-F with 2 filter elements (5 microns and 0.5 microns).
5. COREBRICK-C filled with selective sorbent.
6. COREBRICK-C filled with selective sorbent.

COREBRICK-F is a concrete 1500×1500×1500 mm block containing a hollow 200 liter chamber and also featuring two filter elements sequentially installed at its exit.

COREBRICK-C is a concrete 1500×1500×1500 mm block containing a cylinder 40 liter reservoir with a selective sorbent.

DETAILED DESCRIPTION OF THE PREFERRED EMBODIMENT

The suggested method mainly uses a composition comprising amorphous silicon dioxide from the Sukholozhsky deposit (with size of particles varying up to 500 microns). One or several selective sorbents and a coagulating substance (f.e. nickel sulfate) can be placed in its pores. Such composition helps to handle several challenges:

remove part of radionuclides from the liquid phase and evenly distribute activity in filter elements and sorption blocks.

mold suspended particles and colloids into solid fractions that can be separated easily, which simplifies the process of separating liquid LRW components from the solid ones and reduces the costs.

Amorphous silicon dioxide is a rather light material (0.6 g/cm3). Its mesopores have a large volume and can hold one or several selective sorbents, which provide high availability of the sorption centers.

Practical implementation of this method implies the use of reservoirs with simple filter elements (grids, ceramic filters, etc.), which are placed in concrete casings that are, essentially, concrete blocks themselves. This rules out personnel's radiation exposure. The filtered high-level waste remain inside the concrete blocks, instead of being removed as sludge at the stage of flushing filter elements, as is the case with the prototype and all other known methods. Concrete blocks are safe for transportation and storage. They can be used as elements in special purpose structural units (e.g. for construction of warehouses, radioactive waste storage facilities etc.)

The filtrate is passed through reservoirs with granulated sorbent, since a certain height of sorbent layer is necessary for effective sorption (that ensures optimal time for a filtrate-sorbent contact). Using sorbents in powder forms and at such high level will create high hydrodynamic resistance, thus decreasing filtration speed and making it close to zero.

The set interval (0.1-0.7 mm) in sizes of particles of the powder sorbents is based on the fact that larger particles (more than 0.7 mm) have a smaller surface of absorbing material and, respectively, smaller absorption efficiency, while smaller particles (less than 0.1 mm) are more difficult to separate from the filtrate.

The set interval (1 to 3 mm) in sizes of particles of the granulated sorbents is based on the fact that larger granules (more than 3 mm) have a smaller surface of absorbing material and, respectively, smaller absorption efficiency, while smaller granules (less than 1 mm) create high hydrodynamic resistance and can reduce efficacy of LRW processing.

IMPLEMENTATION EXAMPLE 1

The described method was used to process LRW (pH of 12.1) containing:
solids content (after drying at 105° C.)—285 g/l;
suspended particles (separated on the filter with a blue belt), 5.1 g/l;
specific activity of Cs-137: 1.1.10-3 Ci/l
specific activity cobalt-60: 1.4.10-6 Ci/l Tank 1 was pumped with 5м3 of LRW of the aforesaid composition. Then a composition consisting of nickel ferrocyanide selective sorbent (5 kg), applied to the powder of amorphous silicon dioxide from the Sukholozhsky deposit, that had particles sized 200 to 500 microns, and of nickel sulfate (0.5 kg) as a coagulant was stirred in. The combination of amorphous silicon dioxide and agglomerates, which forms during the interaction process between nickel-based coagulant and LRW suspended particles, makes separation of liquid components from the solid ones inside COREBRICK F very easy.

After a two-hour stirring, the suspension comprising sorbent, LRW-derived suspended particles and a coagulant, was pumped into COREBRICK F 2 equipped with two filter elements. Afterwards, a solution, which was purified from the suspension, was directed for the ozone treatment 3, where the destruction of organic compounds and complexes took place. Suspended solids obtained during the oxidation were mixed with 5 kg of the same sorbent that was stirred into the tank, and a resulting suspension was directed to COREBRICK F 4 equipped with two filter elements. Filtrate purified from the suspended solids was passed through sequentially connected COREBRICKs C 5&6 with granular selective sorbent based on nickel ferrocyanide. The purified filtrate, containing less than 10 Bq/l of Cs-137 and Co-60, was sent to evaporation and crystallization. The final product can be placed at the non-radioactive waste storage site.

COREBRICKs F containing sludge were filled with high-penetrating cement mortar that embeds the inside chamber. COREBRICKs C containing selective sorbents were blasted with hot air and also built in with high-penetrating cement mortar.

Activity registered in COREBRICKs F amounted to 5 Ci each, while in COREBRICKs C it amounted to 9.8 Ci in the first one and 0.2 Ci in the second.

IMPLEMENTATION EXAMPLE 2

The tank was pumped with 25м$^3$ of LRW comprising sea water of the following composition:
total salt content –30 g/l; pH of 7.9; specific activity of Cs-137: 2.4*105 Ci/l.

Fifty kilograms of selective sorbent, based on "Prussian Blue" (Iron (III) hexacyanoferrate (II)) in a form of a dry powder with a particle size of 0.2 to 0.5 mm, was stirred into LRW. After eight hours of mixing, LRW and the sorbent were directed to COREBRICK F featuring one filter element with a pore size of 0.1 mm. Filtrate separated from the sorbent was passed through COREBRICK C, comprising one hundred kilograms of granular selective sorbent based on iron ferrocyanide with a granule size of 1-2 mm. Sea water scrubbed of cesium radionuclides contains less than 5 Bq/l of cesium-137 and may be dumped back into the sea. Used-up sorbents that are in COREBRICKs C and F are built in with high-penetrating cement mortar.

IMPLEMENTATION EXAMPLE 3

The proposed method was used to process LRW containing:
total salt content—228 g/l; pH=10.9;
specific activity of strontium—90, $4.2*104$ Bq/l;
specific activity of cobalt—60:$1.5*104$ Bq/l.

The tank was pumped with $12M^3$ of LRW of the aforementioned composition, and then thirty kilograms of selective sorbent in a form of dry powder based on manganese dioxide were added, and after that 30 kg of powder sorbent based on copper sulfide. The particle size of the powder sorbents did not exceed 0.5 mm. After a three-hour mixing, LRW was directed to COREBRICK F equipped with two filter elements with a pore size of 0.4 and 0.1 mm. Afterwards, filtrate separated from the powder sorbent was passed through COREBRICK C, comprising fifty kilograms of granular selective sorbent, based on manganese dioxide. The total specific activity of isotopes remaining in LRW accounted for no more than 10 Bq/l.

IMPLEMENTATION EXAMPLE 4

The suggested method was used to process LRW containing:
Boric acid g/L, pH=4;
Cs-137 $5.2*106$ Bq/l; Co-60 $3.1*104$ Bq/l;
Ag-110 $8.1*103$ Bq/l; Sr-90 $1.9*105$ Bq/l.

The tank containing $10M^3$ of LRW was consecutively pumped with twenty kilograms of selective sorbents in a form of dry powder (with a particle size of less than 0.3 mm) and of the following composition: copper ferrocyanide, magnesium phosphate, zirconium hydroxide.

After a five-hour mixing, LRW was pumped through two COREBRICKs F with a pore size of 0.2 mm in the first filter and 0.1 mm in the second one. Afterwards, filtrate was passed through three consecutively connected COREBRICKs C, comprising sixty liters of mechanical mixture of selective sorbents with granular size of 3 mm.

Mechanical mixture consisted of homogeneously mixed sorbents:

20 L of copper ferrocyanide,
20 L of magnesium phosphate,
20 L of zirconium hydroxide.

The total specific activity of isotopes remaining in LRW made up not more than 10 Bq/l.

The use of the described method can decrease radiation exposure of personnel processing LRW, streamline the technological procedures of LRW processing, delivering a final product—a block that is safe to transport and use and that doesn't require any radiation safety precautions.

What is claimed is:

1. A method of processing of a liquid radioactive waste and its utilization, comprising: oxidizing of the waste, separating of a sludge, colloids and suspended particles from a liquid phase, and removing, from the liquid phase, radionuclides to be subsequently recovered using selective sorbents and filters; the method is characterized in that, prior to a stage of the sludge, colloids and suspended particles separating from the liquid phase of the radioactive waste, the selective sorbents in a form of powders are added and mixed into the liquid waste and then an obtained suspension is filtered by pumping through, at least one waste disposal container and provided with at least one filter element at its exit; the filter element separating insoluble substances from the liquid phase; then a filtrate is passed through at least one waste disposal reservoir with granulated selective sorbents; with said container and reservoir placed in concrete blocks.

2. The method of claim 1, wherein one or several selective sorbents are used in the liquid radioactive waste processing.

3. The method of claim 1, wherein the waste disposal container has two or more filter element.

4. The method of claim 1, wherein the obtained suspension passed through two or more waste disposal containers with the filter elements.

5. The method of claim 1, wherein the filtrate passed through two or more sequentially connected reservoirs with the granulated selective sorbents.

6. The method of claim 1, further comprising filling the reservoir containing the granulated selective sorbents with a high-penetrating cement mortar after the end of its use.

7. The method of claim 1, further comprising filling the containing insoluble substances removed from the liquid phase, with a high-penetrating cement mortar after the end of its use.

8. The method of claim 6, wherein prior to pouring the cement mortar the reservoir is vacuumized and/or heated with a hot air or an inert gas.

9. The method of claim 1, wherein a size of granules of the selective sorbents is in a range from 1 to 3 mm.

10. The method of claim 1, wherein a size of particles of the selective sorbents added in the form of powder is in a range from 0.1 to 0.7 mm.

* * * * *